Aug. 2, 1949.                G. K. NEWELL                2,477,819
                      TEMPERATURE RESPONSIVE APPARATUS
Filed March 30, 1944                                 5 Sheets-Sheet 5

INVENTOR
GEORGE K. NEWELL

Patented Aug. 2, 1949

2,477,819

UNITED STATES PATENT OFFICE 2,477,819

TEMPERATURE RESPONSIVE APPARATUS

George K. Newell, near Pitcairn, Pa., assignor to The Westinghouse Air Brake Company, Wilmerding, Pa., a corporation of Pennsylvania Application March 30, 1944, Serial No. 528,709

10 Claims. (Cl. 175—294)

This invention relates to hot journal alarm systems for effecting an indication or a control operation in response to excessive heat developed in a bearing or journal, such as the axle journals of railway cars and trains.

The detection of excessive heat in the axle journals of railways and cars and trains, or "hot boxes," as they are commonly known, has long presented a problem to the railroads because of the possibility of damage and possible wreckage of the cars and trains resulting from breakage of the axle caused by the excessive heat in the journal. One of the means for detecting a hot box previously proposed is a fusible element effective to initiate any desired signal or control operation, such as the venting of the brake pipe on the train to effect application of the brakes when the heat developed in the axle journal is sufficient to fuse the element. Other thermal or heat-responsive devices, such as a bi-metallic element, a gas-filled chamber in the form of a flexible bellows, or a thermo-couple have also been proposed and in some instances employed for this purpose.

My present invention comprises a novel means for detecting variations in heat conditions generally and utilization of such novel means for the purpose of detecting a "hot box" on railway cars and trains. The means which I have devised for detecting heat variations comprises, essentially, two resistance elements, one of a relatively low temperature coefficient of resistance and the other of a relatively high temperature coefficient of resistance, both elements being exposed to the same heat condition in a given zone, and electroresponsive indicating or control means arranged in electrical circuit relation with the resistance elements in such manner that the electroresponsive means responds to variation in the differential of the resistances of the two resistance elements caused by a given heat variation.

It is an object of my invention, therefore, to provide a novel means of the character described for registering heat or temperature variations and utilized particularly for the purpose of initiating a signal indication or a control operation in response to a hot journal or hot box condition on railway cars and trains.

Another object of my invention is to provide a hot box signal or alarm system of the character indicated in the foregoing object and further characterized by a reset device so located, for example within the journal casing itself as to require a positive step (that is, removal or opening of the journal end cover or lid) to be taken toward alleviating the hot box condition in order to terminate the operation of the signal.

It is another object of my invention to provide an alarm system for a train of cars in which an alarm signal or control operation is initiated on a car on which a hot box occurs and on the locomotive or power car without initiating a signal on those cars not having a hot box condition, the said system requiring but a single train wire extending from car to car throughout the train.

The above objects, as well as other objects of my invention which will be made apparent hereinafter, are attained by apparatus subsequently to be described and illustrated in the accompanying drawings wherein.

Figure 1:
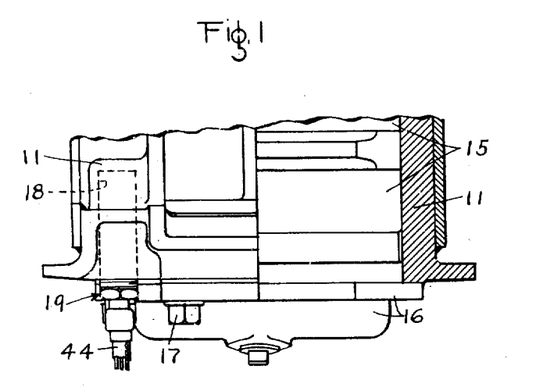
Figs. 1 and 2 are fragmental plan and end views, respectively, of a railway car axle journal casing, partly in section, showing the manner in which the heat detector devices employed in my invention are applied to the journal casing in a manner to register variations in temperature and heat within the journal.
Figure 2:
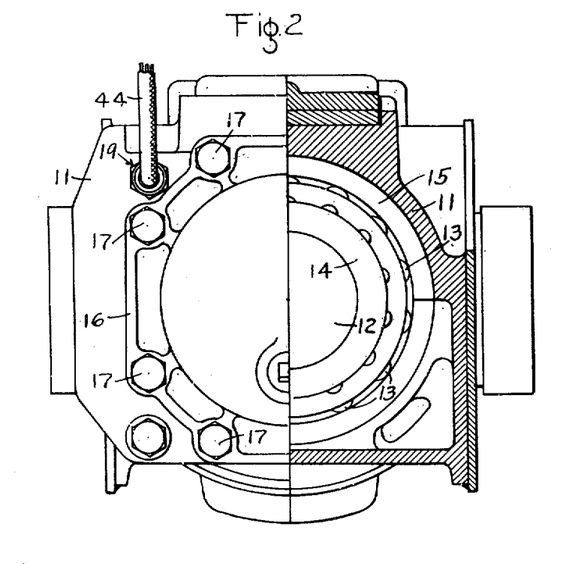

Referring to Figs. 1 and 2, I have shown an axle journal casing 11 for a railway car, in which an axle 12 is supported by means of roller bearings 13 disposed between an inner race 14 and an outer race 15. The end of the journal casing is closed by an end cover 16 secured to the journal casing as by a plurality of screws or bolts 17.

For the purpose of providing access to heat generated in the journal casing I have provided a suitable bore 18 in the journal casing, the bore opening at the outer end of the journal casing at a point clear of the end cover 16 for the purpose of receiving a heat detector device or cartridge 19.

Figure 3:
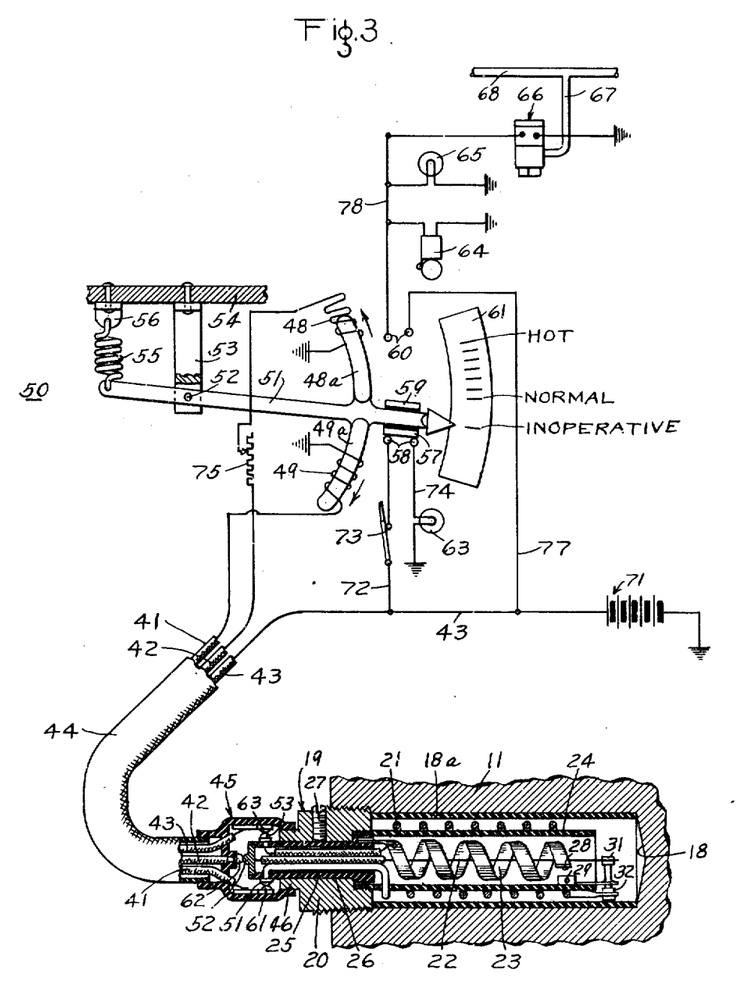
Fig. 3 is a diagrammatic view showing, in simplified form, an embodiment of the novel means which I have devised for registering heat and temperature variations.

Referring to Fig. 3, the heat detector device 19 comprises a screw plug 20 for engagement in the outer threaded end of the bore 18 in the journal casing 11, and parts, presently to be described, carried by the plug as a unit. The parts referred to include a resistance element 21 of relatively high temperature coefficient of resistance, a resistance element 22 of substantially uniform or at least relatively low temperature coefficient of resistance 22, and a thermal-responsive switch device comprising a bi-metallic helix 23 that is operatively responsive to variations of heat within the bore 18 in a manner more fully explained hereinafter.

The resistance element 21 may be of any suitable material, such as iron wire which has a temperature coefficient of resistance of .005. As illustrated the resistance element 21 is wound in helical form on the outside of an insulating sleeve 24 that is removably attached to the inner surface of the screw plug 20, as by a threaded connection in the manner shown.

The bi-metallic helix 23 is secured at one end to an insulating sleeve 25 that is slidably inserted in a central bore 26 in the screw plug 20 and held in position by a set screw 27. The opposite end of the helix 23 is provided with a switch contact 28 that is arranged to move in a circumferential arc within the sleeve 24 as a result of torsional forces acting on the helix in response to variation of heat within the bore 18. Switch contact 28 is spaced from a stationary switch contact 29 fixed on the inner surface of the sleeve 24 at a normal temperature and is shifted into engagement therewith upon a predetermined rise in temperature from the normal temperature. By loosening the set screw 27 and turning the sleeve 25 in either direction, the amount of movement of contact 28 required to engage the contact 29 may be correspondingly varied so as to increase or decrease the amount of temperature variation with respect to the normal temperature required to effect engagement of the switch contacts. As will be explained more fully hereinafter, the thermal-responsive switch device comprising switch contacts 28 and 29 is utilized for the purpose of conserving electrical current energy and preventing the consumption of electrical energy until such time as it is needed for the purpose of indicating an abnormal or hot box condition.

The resistance element 22 is shown in the form of a rigid straight wire of suitable material, such as a manganin or constantan which have a temperature coefficient of resistance of .00001. Element 22 is coaxially disposed within the helix 23 and is supported at one end within the sleeve 25, the opposite end being supported within and electrically connected to a small metallic bushing 31 attached to or integral with a leg of the switch contact 29 on the insulating sleeve 24.

The end of the resistance element 21 remote from the screw plug 20 is electrically connected to a bushing 32 attached to or integral with the leg of the switch contact 29.

Electrical connections are established from three wires 41, 42, and 43, contained in a suitable armored cable or conduit 44, to the resistance element 21, the resistance element 22 and the bi-metallic helix 23 respectively, by means of an electrical coupling 45 having a bayonet type connection to a circular boss 46 on the outer end of the screw plug 20.

The sleeve 25 carries three contacts 51, 52, and 53 that are respectively connected by insulated wires extending through the interior of the sleeve 25 to the resistance element 21, the resistance element 22 and the bi-metallic helix 23.

The body of the electrical coupling 45 is preferably of insulating material and is substantially cylindrical in form. Suitably attached to the interior of the body of the electrical coupling 45 are contacts 61, 62 and 63 to which the wires 41, 42 and 43 in the cable 44 are respectively connected and attached.

The contact 62 is disposed at the center of the coupling 45 and engages the associated aligned contact 52 regardless of the rotary position of the sleeve 25 with respect to the body of the coupling 45. The contacts 61 and 63 in the coupling device 45 are of arcuate nature so as to remain in contact with the associated contacts 51 and 52 on the sleeve 25 regardless of the rotary position of the sleeve 25 over a specified or predetermined adjusting range of the bi-metallic helix 23.

That portion of the resistance element 21 within the bore 18 is bare of insulation in order to be more readily responsive to variations of heat and temperature within the bore. In order, therefore, to prevent a grounding of this resistance element to the journal casing, due to shock and vibration, an insulating sleeve 18a is provided within the bore 18.

Associated with the heat detector device 19 is an electro-responsive device 50 comprising two electromagnetic windings or solenoids designated 48 and 49, respectively. The windings 48 and 49 are associated with corresponding and oppositely extending arcuate arms of magnetic material 48a and 49a secured to a pivoted operating member 51. The operating member 51 is pivoted on a pin 52 carried by a yoke member 53 attached to a suitable stationary support 54. A coil spring 55 connected at one end to the operating member 51 and at the other end in a bracket 56 attached to the support 54 is so tensioned as to yieldingly urge the operating member 51 in a clockwise direction to normally effect engagement of a contact 57 carried in insulated relation by the member 51 with a pair of stationary spaced contacts 58.

The winding 48 is effective, when energized, to exert a pull in the direction of the arrow tending to rotate the operating member 51 in a counterclockwise direction whereas the winding 49 is effective, when energized, to exert a pull in the opposite direction, as indicated by the adjacent arrow, tending to rotate the operating member 51 in a clockwise direction. It will thus be apparent that the forces exerted by the magnetic windings 48 and 49 are in opposition.

When, for reasons hereinafter explained, the winding 48 is energized by a current higher than that energizing the winding 49, the unbalanced magnetic force is effective to rotate the operating member 51 in a counterclockwise direction in opposition to the yielding resisting force of the coil spring 55. Upon a predetermined degree of movement in a counterclockwise direction, a contact 59 carried in insulated relation on the operating member 51 engages a pair of stationary spaced contacts 60.

The free end of the operating member 51 is formed as a pointer and an indicating dial 61 is associated therewith. On the dial 61 are marked three positions designated respectively "Inoperative," "Normal," and "Hot." A plurality of graduating markings are also provided on the dial between the two positions marked Normal and Hot.

The switch formed by the contacts 57 and 58 is effective to control a signal device, illustrated as a signal lamp 63, in a manner more fully pointed out hereinafter. The switch formed by the contacts 59 and 60 is effective to control one or more suitable devices, referred to herein generally and particularly in the claims as signal devices, illustrated as an audible signal device in the form of a bell 64, a visible signal device such as a signal lamp 65, and a brake application initiating device in the form of a magnet valve 66. The magnet valve 66 is connected by a branch pipe 67 to the usual brake pipe 68 on a car or train and is effective when energized to effect a desired reduction in the pressure in the brake pipe to initiate a brake application on the train.

Operation

Let it be supposed that the setting of the bi-metallic helix 23 is such that the switch contacts 28 and 29 in the heat detector device 19 engage only after a normal operating temperature of the journal is reached. If, therefore, a car has been out of service or has been standing still for a relatively long period of time, the switch contacts 28 and 29 will be separated. In such case, the circuits for energizing the windings 48 and 49 of the electroresponsive device 50, which circuits will be hereinafter traced, are interrupted and the operating member 51 is accordingly biased to a position effecting engagement of the contact 57 with the contacts 58, as shown. A circuit is thereby completed for energizing the signal lamp 63, this circuit extending from the positive terminal of a suitable source of energy, such as a storage battery 71, by way of the wire 43 connected thereto, a branch wire 72 including a suitable switch device 73 shown in closed position, switch contacts 58 and 57, a wire 74 including a signal lamp 63 and thence to the negative terminal of the battery 71 through a ground connection in the manner shown. The switch 73 is provided for interrupting the circuit of the signal lamp 63 when a car or train is out of service, thereby preventing constant consumption of electrical energy from the battery 71.

The signal lamp 63 serves also to indicate the inoperative condition of a heat detector device 19, thereby calling attention to the fact and enabling suitable repair or replacement thereof at a suitable time. This function of the signal lamp 63 will be particularly apparent later on by reason of the fact that under normal operating conditions, the circuit of the signal lamp 63 should be open and the light extinguished so long as the heat detector devices 19 are operating properly.

Now let it be assumed that, due to travel of the car or train, the heat generated in the axle journal causes the temperature therein to rise to its normal operating temperature and that the switch contacts 28 and 29 of the heat detector devices 19 are correspondingly engaged. In such case, a circuit is established for energizing the windings 48 and 49 of the electroresponsive device 50.

The circuit for energizing the windings 48 and 49 extends from the positive terminal of the battery 71 by way of the wire 43, contacts 63 and 53 of the electrical coupling device 45, bi-metallic helix 23, and switch contact 28 to the switch contact 29, whence the circuit divides into two parallel branches, one branch extending by way of the bushing 31, resistance element 22, contacts 52 and 62 of the coupling device 45, wire 42, an adjustable resistor 75, magnet winding 48, and thence to the negative terminal of the battery 71 through a ground connection in the manner shown. The second branch extends from the switch contact 29 by way of the bushing 32, resistance element 21, contacts 51 and 61 of the coupling device 45, wire 41, winding 49 and to the negative terminal of the battery 71 through a ground connection in the manner shown.

The windings 48 and 49 are thus energized by a current determined by the respective resistance values of the resistance elements 22 and 21. The resistance values of resistance elements 21 and 22 are such that the current energizing the winding 48 is higher than the current energizing the winding 49 and the winding 48 therefore exerts a sufficient differential force on the operating member 51 to move it instantaneously from its Inoperative position to the Normal position. The resistor 75 is provided in order to adjust the current in the winding 48 with respect to the current in the winding 49 so as to insure the movement of the operating member 51 in an exact manner to the Normal position. It will be apparent that sufficient manufacturing differences of the resistance elements 21 and 22 in different heat detector devices 19 may occur to prevent an exact movement of the operating member 51 to the normal position indicated on the valve 61 unless a suitable means, such as the adjustable resistor 75, is provided for insuring this.

As long as the temperature within the axle journal remains substantially normal, the operating member 51 remains substantially in its Normal position, thereby indicating to the observer that the journal is in a normal heat condition.

Let it now be supposed that an abnormal heat condition occurs in the journal casing and that the temperature in the journal correspondingly rises to an abnormal or dangerous degree. As the temperature in the journal casing rises, the resistance of the resistance element 22 remains substantially uniform due to the relatively low temperature coefficient of resistance thereof. On the other hand, the resistance of the resistance element 21 rises appreciably due to the relatively high temperature coefficient of resistance. It will thus be seen that due to the increasing differential in the resistance of the two resistance elements 21 and 22 with rising temperature, the current in the winding 48 reduces with respect to the current energizing the winding 49. Consequently the winding 48 exerts an unbalanced force displacing the operating member 51 in a counterclockwise direction to a progressively greater degree out of its Normal position toward its Hot position as the temperature in the journal casing rises above the normal temperature.

When the operating member 51 reaches the Hot position on the dial 61, indicating an approach to a dangerous heat condition in the journal, the switch contact 59 engages the switch contacts 60 and establishes a circuit for energizing the alarm bell 64, the signal lamp 65, and the magnet valve 66.

This circuit extends from the positive terminal of the battery 71 by way of the wire 43, a branch wire 77, switch contacts 59 and 60, to a wire 78, and thence in three parallel branches containing the alarm bell 64, signal lamp 65 and the magnet winding of the magnet valve 66, respectively, to the negative terminal of the battery through ground connections in the manner shown.

Energization of the winding of the magnet valve 66 causes a reduction of the pressure in the brake pipe 68 and a consequent application of the brakes on the car or train, thus automatically causing the operator of the train to take cognizance of the dangerous journal condition and enabling him to take suitable steps to alleviate the condition before serious damage can occur.

It will be apparent that while I have shown an alarm bell, a signal lamp, and a brake initiating valve operated in response to a dangerous heat condition in the journal, any one or any combination thereof may be employed or any other suitable devices may be actuated in place of the signal or brake controlling devices shown.

As previously indicated, if the signal lamp 63 remains energized at a time when it should be extinguished by reason of the travel of the train and the expected normal heating of the axle journals, a member of the train crew will be informed with certainty that the heat detector device is out of order and may then take steps to cause repair or replacement of this device.

Assuming now that following the occurrence of an abnormal heat condition as just described, suitable steps are taken to remedy the condition and that the temperature in the journal correspondingly decreases, it will be seen that the operating member 51 will be automatically returned toward its Normal position and, upon the return of the journal to its Normal temperature, will again be positioned in the Normal position indicated on the dial 61.

As the temperature of the journal further decreases due, for example, to a train standing still for a long period of time the switch contacts 28 and 29 in the heat detector device 19 will be automatically separated and the circuit for energizing the windings 48 and 49 will be thereby interrupted. Undesired consumption of current or energy from the battery 71 is thus prevented.

While I have explained above that the operating member 51 is actuated to its Normal position in response to the engagement of the switch contacts 28 and 29 at the time that the bearing or journal attains a normal operating temperature, it will be apparent that the temperature at which the windings 48 and 49 are rendered operative may be selected at any point between the Normal position and the Hot position on the dial 61. Thus, if desired, the set screw 27 may be loosened and the sleeve 25 rotated so as to shift the switch contact 28 farther away from the contact 29 and then re-tightened so as to provide a new setting of the switch contacts 28 and 29 such that engagement thereof will be effected at a point closely approaching the Hot condition. Greater conservation of current and energy of the battery 71 will thus be effected. However in such case there will be no indication of the normal operating temperature of the journals.

Figure 4:
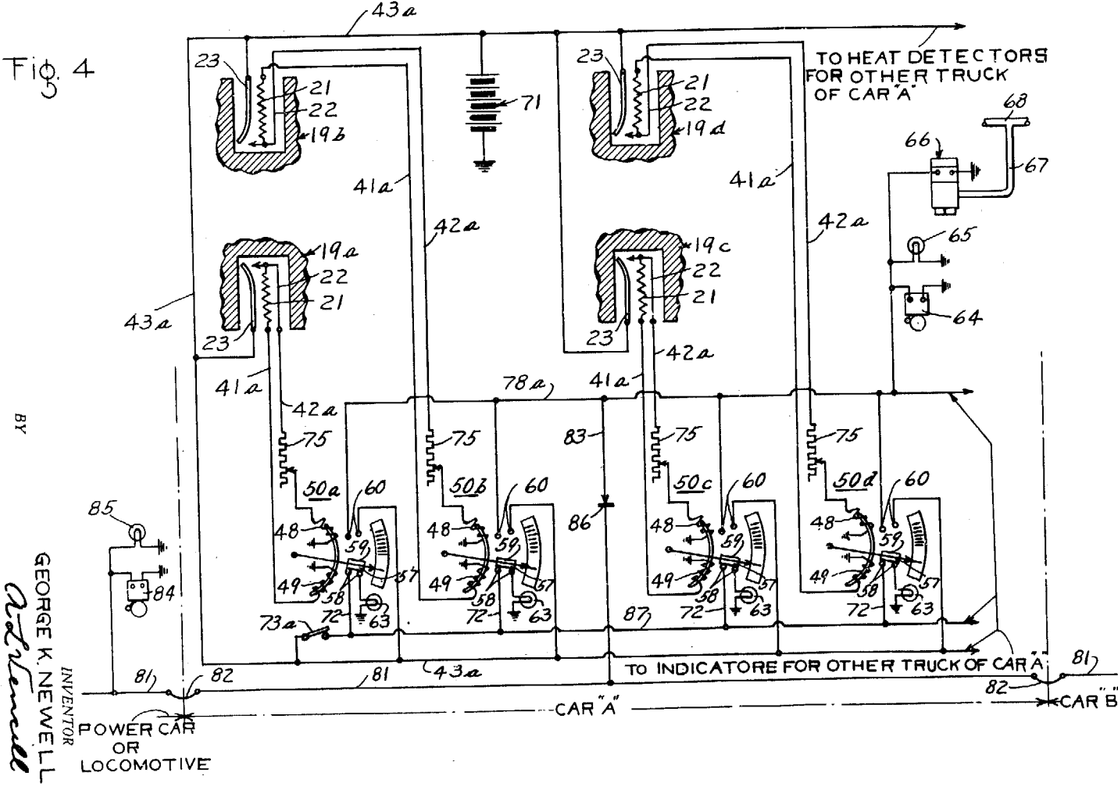
Fig. 4 is a diagrammatic view showing an alarm system for a train of cars utilizing the apparatus shown in Fig. 3.

Referring now to Fig. 4, there is indicated a hot journal alarm system for a train of cars, including a power car or locomotive and two trailer cars designated "car A" and "car B" respectively, employing the apparatus previously described. Specifically, there is shown for "car A" four heat detector devices 19a, 19b, 19c, and 19d, associated respectively with the four journals of a four-wheel car truck, and four corresponding electro-responsive devices 50a, 50b, 50c, and 50d. In Fig. 4, the various devices are shown merely in diagrammatic form and corresponding parts in Fig. 3 and Fig. 4 are designated by the same reference numerals without further description.

While the heat detector devices and the electroresponsive devices for the other truck on "car A" are not shown in detail, the manner in which they are connected in the system is indicated.

It will be seen that the bi-metallic helix 23 of each of the heat detector devices is connected to a bus wire 42a, hereinafter designated the positive battery wire. The resistance elements 21 and 22 of each heat detector device are connected to the windings 48 and 49, respectively, of the corresponding electroresponsive device by wires 41a and 42a, the adjusting resistors 75 being included in each of the wires 42a for the same purpose described in connection with the apparatus shown in Fig. 3.

The switches of the electroresponsive devices 50a, etc., formed by the switch contacts 59 and 60 are connected in parallel relation between the positive battery wire 43a, and a bus wire 78a, to which the alarm bell 64, the signal lamp 65 and the magnet winding of the magnet valve 66 are connected. It will thus be seen that upon engagement of the contacts 59 and 60 of the switch devices of any one of the electroresponsive devices on the car, the alarm bell 64, the signal lamp 65 and the winding of the magnet valve 66 are energized in the same manner as previously described in connection with Fig. 3.

There is additionally provided, in Fig. 4, a single train wire 81, the sections of which on the several cars and on the locomotive are connected through suitable connectors or couplings 82. The bus wire 78a is connected by a wire 83 including an asymmetric device 86 which may take the form of a dry-disk or a tube type of rectifier. The asymmetric device 86 is so connected in the circuit as to permit the flow of current from the bus wire 78a to the train wire 81 but to prevent reverse flow of current from the train wire 81 to the bus wire 78a. It will thus be apparent that the train wire 81 on "car A" will be energized, that is current will flow therein in response to the closure of any of the switch devices formed by contacts 59 and 60 of the electroresponsive devices 50a, etc., on "car A" but that, due to the asymmetric devices 86 provided thereon no energization of the bus wire 78a on "car B" or any other car in the train similarly equipped can occur. Thus the actuation or energization of any of the signal devices, that is, alarm bell 64, signal lamp 65, and magnet valve 66 on car B and other cars will not occur in response to a hot box condition on car A.

In order to apprise the operator of the train, stationed on the power car or locomotive, of a hot box condition on any of the cars in a train, suitable signal devices, illustrated as a signal lamp 85 and an alarm bell 84, are provided on the locomotive and connected, in parallel relation to each other, between the train wire 81 and a ground connection.

It will thus be seen that whenever a hot box condition occurs on any of the cars in a train, a signal will be given on that car and on the locomotive or power car but on no other car.

The switch contacts 57 and 58 of each of the electroresponsive devices 50a, etc., are effective upon engagement to effect energization of the corresponding signal lamp 63 as in the case of the embodiment shown in Fig. 3. In order to enable the circuit for all of the signal lamps 63 on each car, such as "car A," to be extinguished when the car is out of service, one of the contacts 58 of each switch is connected to a bus wire 87 local to the corresponding car, which bus wire 87 is connected to the positive battery wire 43a by a suitable switch 73a corresponding to the switch 73 in Fig. 3. The switch 73a is normally closed and is effective when open to interrupt the connection between the bus wire 87 and the battery wire 43a, thereby extinguishing the signal lamp 65 simultaneously.

As in the case of the embodiment shown in Fig. 3, any one or all of the signal devices 64, 65 and 66 may be employed. Thus, the magnet valve 66 may be omitted, if desired, in order to avoid an automatic application of the brakes upon the occurrence of a hot box condition.

Referring to Fig. 5, there is shown a modification of the arrangement illustrated in Figs. 1, 2, and 3. In this modification it is desired to insure that some positive step be taken toward alleviation of a hot box condition occurring on any car of the train, in order to terminate a signal initiated in response to the occurrence of the hot box condition. To this end a modified form of end cover 16a for the journal casing 11 is provided which covers the opening of the bore 15 in the journal casing. A modified form of heat detector device 18A is provided that differs from the heat detector device 18 essentially in omitting the contacts 51, 52, 53, on the end of the sleeve 26. As will appear presently, no coupling device corresponding to the coupling 44 is required in the embodiment shown in Fig. 5 and consequently the wires may be connected directly to the resistance elements 21 and 22 and the bi-metallic helix 27. A modified form of screw plug 19a may therefore be employed that does not have the extension 48 thereon which screw plug 19 has.

For convenience, the wires connected to the elements of the heat detector device 18A are designated in Fig. 5 by the reference numerals 41, 42, and 43 employed for the same purpose in the apparatus shown in Fig. 2.

For convenience of installation, the sections of the wires 41, 42, and 43 on the interior of the journal casing and the sections of these wires exterior to the journal casing are connected to the interior and exterior ends respectively of suitable binding posts 41p, 42p, and 43p, which binding posts extend through a suitable insulating bushing 81 in the end cover 16a. The insulating bushing 81 is made up of two parts that are secured together by the binding posts and thereby held securely in the end cover.

In order to insure the continuance of an alarm signal, set up in response to the occurrence of a hot box condition, until some positive step is taken toward alleviation of the hot box condition, I have provided a so-called reset switch 94 suitably attached on the inside face of the end cover 16a.

Reset switch 94 is a relay of standard construction adapted for my purpose. As diagrammatically shown in Fig. 5, such relay comprises an electromagnetic winding 95 and an associated armature 96. When the winding 95 is deenergized, the armature is yieldingly urged by a spring 97 to a position in which two insulated contacts 98 and 99 carried by the armature are disengaged from associated stationary contacts. When the winding 95 is energized, the contacts 98 and 99 are both actuated into circuit closing contact with their associated stationary contacts.

As will be explained presently, a circuit is provided whereby the winding 95 is maintained energized over one of the contacts, namely, the contact 98, acting as a self-holding contact. In order to restore the contacts 98 and 99 of the reset switch 94 to open position pressure must be exerted manually on a push button 101 attached to the armature 96 or cooperating therewith.

The essential difference between the circuit connections in the embodiment shown in Fig. 5 with respect to those shown in Fig. 3 lies in the fact that the switch contacts 53 and 54 of the electroresponsive device 35 are effective upon engagement to effect energization of the winding 95 of the reset switch 94 and contact 99 of the reset switch 94 is effective when thus actuated to closed position to effect energization of the signal devices, exemplified by alarm bell 64 and signal lamp 65. Magnet valve 66 is omitted from Fig. 5 for simplicity, and also to point out that it may be omitted entirely if desired.

The circuit for energizing the winding 95 of the reset switch 94 extends from the positive terminal of the battery 71 by way of the wire 43, branch wire 75, contacts 53 and 54, a wire 76 including a binding post 76p in the insulating member 81 in the end cover 16a, winding 95, and thence to the negative terminal of the battery 71, as through a ground connection in the manner shown.

The circuit for energizing the alarm bell 64 and signal lamp 65 in response to actuation of the contact 99 of the reset switch 94 to its closed position extends from the positive terminal of the battery 71 by way of the wire 43, binding post 43p, wire 43r, contact 99, wire 78a including a binding post 78ap in the insulator 81, and thence in parallel through the alarm bell 64 and signal lamp 65 to the negative terminal of the battery 71 as through a ground connection in the manner shown.

The train wire 31, corresponding to the train wire shown in Fig. 4, is energized by way of the wire 83 including the asymmetric device 84 to thereby cause energization of suitable signal devices on the locomotive or power car, not shown, but corresponding to the devices 84 and 85 shown in Fig. 4.

With the contact 98 of the reset switch 94 in its closed position, a self-holding circuit is established for maintaining the winding 95 energized and the contacts 98 and 99 consequently in their closed position. This circuit extends from the positive terminal of the battery 71 by way of the wire 43 including the binding post 43p, wire 43r, contact 98, winding 95, and to the negative terminal of the battery 71 through the ground connection shown.

It will thus be seen that the contacts 98 and 99 of the reset switch 94 are locked in their closed positions and the alarm devices 64 and 65 on the car, as well as the alarm devices on the locomotive, are continuously operated until such time as the contacts 98 and 99 are restored to open position by pressure manually applied on the push button 101 of the reset switch 94.

In view of the fact that the reset switch 94 is inside the journal casing, it is necessary that the train be brought to a stop by a brake application if the car is in motion, in order that the end cover 16a be removed from the journal casing and thus provide access to the push button 101 of the reset switch 94. If the magnet valve 66 is provided, such brake application will be automatically effected but if the magnet valve 66 is omitted there it is necessary that the operator take the initiative in causing an application of the brakes. Having thus necessitated the removal of the end cover 16a, the first step in alleviating the hot box condition has been taken. Having proceeded this far, the extra effort involved in correcting the hot box condition is relatively slight. It is thus seen that in order to prevent the continued sounding of an alarm bell or the continuous illumination of a signal lamp, the train crew will not deliberately or accidentally avoid taking steps to correct a hot box condition.

Figure 6:
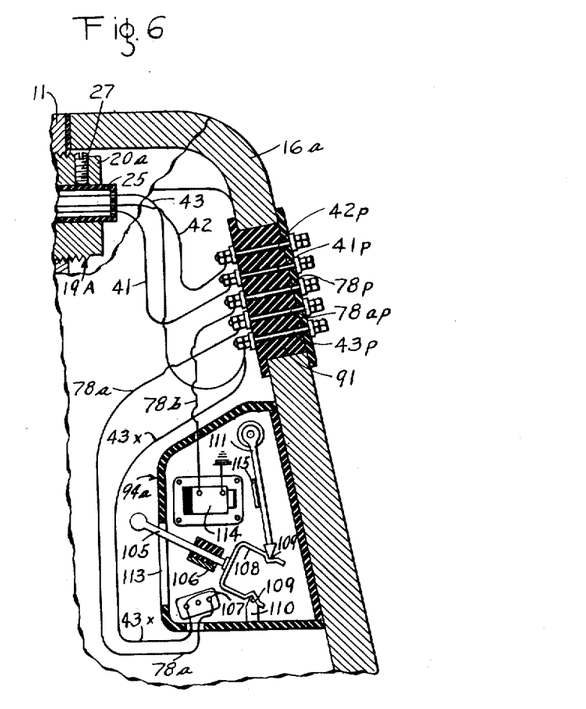
Fig. 6 is a fragmental view showing a modification of the apparatus of Fig. 5 and characterized by a reset switch device of the toggle type and Fig. 7 is an enlarged view in perspective of an operating element of the reset switch device shown in Fig. 6.
Figure 7:
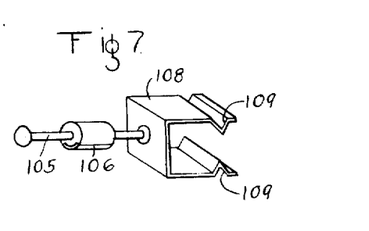

Referring to Figs. 6 and 7, I have illustrated a modified form of reset switch 94a of the toggle type.

The reset switch 94a comprises a suitable casing, preferably of insulated material, attached to the interior surface of the end cover 16a. Suitably mounted and contained within the casing of the reset switch 94a is a toggle switch comprising a toggle member 105 having a contact 106 in insulated relation thereon arranged to cooperate with a pair of stationary insulated contacts 107 suitably attached to the casing. Secured to one end of the toggle member 105 is a U-shaped spring member 108 having suitable grooves 109 in the opposite legs thereof. A fulcrum 110 formed integral with a casing of the switch device, or attached thereto, engages in the groove 109 on one leg of the spring member 108. An arm 111 pivoted on the casing of the switch device has a pointed end which engages in the groove 109 in the other leg of the spring member. The fulcrum 110 lies on the projection of dead center position of the arm 111 and thus the toggle member 105 is in unstable equilibrium when in a horizontal position. As will be seen in Fig. 6, the toggle member extends through a slot 113 in the casing of the switch device 94a and has knob formed on the end thereof for hand operation.

Normally the toggle member 105 is in a raised position, thereby disengaging the contact 106 from the contacts 107. Engagement of the contact 106 with the contact 107 is effected by means of an electromagnet or solenoid 114, suitably mounted and attached within the casing of the switch device 94a. The pivoted arm 111 carries a magnetic element 115 whereby, upon energization of the electromagnet 114, a magnetic force of attraction is exerted on the arm 111 pivoting it in a clockwise direction and causing the toggle member 105 to be snapped over dead center in a counterclockwise direction to effect engagement of the contact 106 with the contacts 107. Once the arm 111 is moved to the left side of its dead center position, the switch contacts 106 and 107 are maintained firmly in contact by the action of spring member 108, notwithstanding the deenergization of the electromagnet 114. The switch contact 106 is separated from the contact 107 merely by raising the knob on the end of the toggle member 105, thereby snapping the pivoted member 111 to the right-hand side of said center position in which it is thereafter maintained by action of spring member 108 until such time as the electromagnet 114 is again energized.

Figure 5:
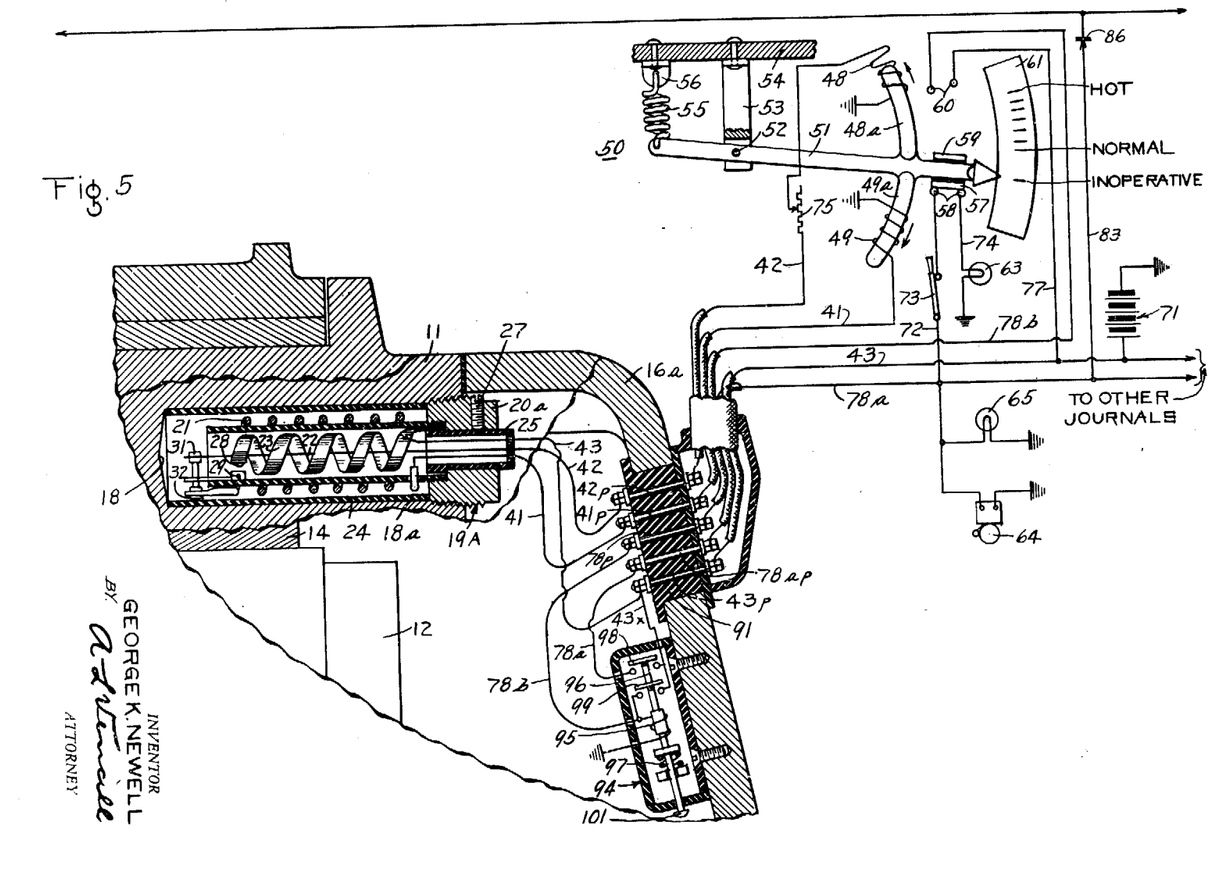
Fig. 5 is a fragmental diagrammatic view showing a modification of the apparatus disclosed in Fig. 3 and characterized by a reset switch of the relay type located within the axle journal casing.

In Fig. 6, I have omitted the wires connected to the exterior ends of the binding posts in the insulator 91, because the apparatus exterior to the journal is the same as shown in Fig. 5. The connections from the resistance elements 21 and 22 and the bi-metallic helix 23 to the interior ends of the binding posts in insulator 91 is effected by the same wires 41, 42, and 43 as in Fig. 5.

The interior end of binding post 78p is connected by the wire 78b to one terminal of electromagnet 114 of the reset switch 94a, the other terminal of the electromagnet being connected to the negative terminal of the battery 71, as through a ground connection shown.

It will thus be apparent that upon engagement of the contact 89 with the associated contacts 60 of the electro-responsive device 50, a circuit is established for energizing the electromagnet 114 in the same manner that the magnet winding 95 of the reset switch 94 is energized.

Contacts 106 and 107 of the reset switch 94a are effective when engaged to perform the same function as the contact 98 of the reset switch 94 in Fig. 5, that is, to connect the interior ends of the binding posts 43p and 78ap. It will be seen that the interior end of the binding post 43p is connected by a wire 43x to one of the contacts 107, while the other contact 107 is connected by a wire 78a to the interior end of the binding post 78ap. When the two contacts 107 are bridged by the contact 106, a connection is thus established between the binding posts 43p and 78ap.

It will thus be apparent that with the contacts 106 and 107 of the reset switch 94a in engagement, a circuit is established for energizing the signal devices 64, 65, in the same manner as in the embodiment shown in Fig. 5, as well as signal devices located on the locomotive through the wire 81.

As in the case of the embodiment shown in Fig. 5, in order to terminate a continuous operation of the signal devices on the car and on the locomotive, it is necessary to remove the end cover 16a and manually shift the toggle member 105 upwardly to separate the contacts 106 and 107 of the reset switch 94a.

Having now described my invention, what I claim as new and desire to secure by Letters Patent, is:

1. Heat responsive apparatus comprising two resistance elements having different temperature coefficients of resistance, respectively, so that a given variation in the temperature of a given zone to which both elements are exposed causes correspondingly different variations in resistance of said elements, a pivoted member having two oppositely extending arms of magnetic material, resilient means constantly biasing said pivoted member toward a certain position, a first electromagnetic winding associated with one of said arms, a second electromagnetic winding associated with the other of said arms, means for energizing said first winding by current dependent upon the resistance of one of said elements and for energizing the said second winding by a current dependent upon the resistance of the other of said elements, said windings and resistances being so arranged that with the windings energized and exerting opposing forces, respectively, tending to move said pivoted element in opposite directions, the force exerted by said first winding progressively increases with respect to the force exerted by said second winding as the temperature in said zone increases, whereby the said pivoted element is shifted progressively through a plurality of different positions in one direction out of said certain position thereof.

2. Heat responsive apparatus comprising two resistance elements, one of which has a low temperature coefficient of resistance and the other of which has a relatively high temperature coefficient of resistance whereby the resistance of said other resistance element increases a greater amount than that of said one resistance element for a given rise in temperature to which said elements are both exposed, two electro-responsive means one of which is energized in accordance with the resistance of said one resistance element and the other of which is energized in accordance with the resistance of the said other resistance element, means controlled by the cooperative action of said two electroresponsive means in a manner substantially reflecting variations of the temperature to which said resistance elements are exposed, and thermal-responsive means exposed to the same temperature to which said resistance elements are exposed for initiating energization of said two electro-responsive means only when the said temperature exceeds a certain degree.

3. Heat responsive apparatus comprising two resistance elements, one of which has a low temperature coefficient of resistance and the other of which has a relatively high temperature coefficient of resistance whereby the resistance of said other resistance element increases a greater amount than that of said one resistance element for a given rise in temperature to which said elements are both exposed, two electro-responsive means one of which is energized in accordance with the resistance of the said one resistance element and the other of which is energized in accordance with the resistance of the said other resistance element, means controlled by the cooperative action of said two electro-responsive means in a manner substantially reflecting variations of the temperature to which said resistance elements are exposed, and a bi-metallic thermal-responsive switch device for effecting energization of said two electro-responsive means only when the temperature to which said resistance elements are exposed exceeds a certain degree.

4. Heat responsive apparatus comprising two resistance elements, one of which has a low temperature coefficient of resistance and the other of which has a relatively high temperature coefficient of resistance whereby the resistance of said other resistance element increases a greater amount than that of said one resistance element for a given rise in temperature to which said elements are both exposed, two electro-responsive means, one of which is energized in accordance with the resistance of said one resistance element and the other of which is energized in accordance with the resistance of the said other resistance element, means controlled by the cooperative action of said two electro-responsive means in a manner substantially reflecting variations of the temperature to which said resistance elements are exposed, and a bi-metallic switch element in the form of a helix torsionally responsive to variations in the temperature to which said resistance elements are exposed for effecting energization of said two electro-responsive means only after said temperature exceeds a certain degree.

5. A thermal-responsive device comprising a supporting member, two resistance elements carried by said supporting member, one of said resistance elements having a low temperature coefficient of resistance and the other having a relatively high temperature coefficient of resistance whereby a progressively increasing differential in the resistances of said two resistance elements occurs in response to a progressively increasing temperature in a heat zone to which said resistance elements are exposed, and switch means responsive to a predetermined temperature in said zone for rendering said resistance elements operatively effective.

6. A thermal-responsive device comprising a supporting member, two resistance elements carried by said supporting member, one of said resistance elements having a high temperature coefficient of resistance and being in the form of a helix, the other of said resistance elements being of relatively low temperature coefficient of resistance and in the form of a straight wire of substantial rigidity disposed coaxially within said one resistance element, and switch means carried by said supporting member and operative in response to a predetermined temperature in a zone to which said resistance elements are exposed for rendering said resistance elements functionally effective.

7. A thermal-responsive device comprising a supporting member, two resistance elements carried by said member in insulated relation, one of said resistance elements having a high temperature coefficient of resistance and being in the form of helix, the other of said resistance elements having a relatively low temperature coefficient of resistance and being of substantial rigidity and disposed coaxially with respect to and within said one resistance element, and a switch device including a bi-metallic helix disposed in concentric relation to and within said one resistance element and concentrically surrounding said other resistance element, said switch device being effective upon the occurrence of a predetermined temperature in the zone to which said resistance elements are exposed for rendering said resistance elements functionally effective.

8. A thermal-responsive device comprising a supporting member, two resistance elements carried by said supporting member, one of said resistance elements having a high temperature coefficient of resistance and the other of said resistance elements having a relatively low temperature coefficient of resistance, thermal-responsive switch means carried by said supporting member, and means for rendering said thermal-responsive switch means selectively effective to render the said resistance elements functionally effective at any one of a plurality of different temperatures occurring in the zone to which said resistance elements are exposed.

9. Apparatus for signaling the heat condition of a journal, said signaling apparatus comprising two resistance elements exposed to the heat in the journal and having different temperature coefficients of resistance respectively so that a progressively increasing differential in the resistance of the two elements occurs in response to a progressively increasing temperature in said journal, a movable element, means yieldingly biasing said movable member to an inoperative position, electroresponsive means for actuating said movable member out of the inoperative position, in opposition to the force of the biasing means, to any one of a plurality of different positions depending upon the degree of the differential in the resistance of the two elements, and thermal-responsive means subject to heat conditions in the journal and effective when the journal attains a normal operating temperature for rendering the electro-responsive means operatively effective in accordance with the differential in the resistance of the two resistance elements.

10. Temperature responsive apparatus comprising a control device having a movable control element and electro-responsive means effective upon variations in the energization thereof to effect corresponding movement of said element, temperature-responsive resistance means subject to the temperature in a given zone for controlling the energization of said electro-responsive means in accordance with the variations in the resistance thereof resulting from variations of the temperature in said zone, and switch means effective only upon the attainment of a certain uniform normal temperature in said zone for effecting energization of said electro-responsive means and at the same time rendering said resistance means effective to control the energization of said electro-responsive means.

GEORGE K. NEWELL.

REFERENCES CITED

The following references are of record in the file of this patent:

UNITED STATES PATENTS

| Number | Name | Date |
|---|---|---|
| Re. 15,436 | Swan | Aug. 22, 1922 |
| 479,828 | Mumford | Aug. 2, 1892 |
| 540,008 | Whipple et al. | May 28, 1895 |
| 1,052,528 | Sundh | Feb. 11, 1913 |
| 1,252,502 | Shreeve | Jan. 8, 1918 |
| 1,400,410 | Bossu | Dec. 13, 1921 |
| 1,411,311 | Sullivan | Apr. 4, 1922 |
| 1,748,862 | Brown | Feb. 25, 1930 |
| 1,910,575 | Thomas | May 23, 1933 |
| 1,919,693 | Faus | July 25, 1933 |
| 1,954,832 | Ruben | Apr. 17, 1934 |
| 2,060,215 | Hopkins et al. | Nov. 10, 1936 |
| 2,098,650 | Stein | Nov. 9, 1937 |
| 2,106,756 | Obermaier | Feb. 1, 1938 |
| 2,112,228 | Crago | Mar. 29, 1938 |
| 2,164,674 | Ziegler | July 4, 1939 |
| 2,236,891 | Bridges | Apr. 1, 1941 |
| 2,269,019 | Hall | Jan. 6, 1942 |
| 2,388,855 | Leslie | Nov. 13, 1945 |

FOREIGN PATENTS

| Number | Country | Date |
|---|---|---|
| 401,667 | Germany | Sept. 8, 1924 |
| 539,543 | Great Britain | Sept. 16, 1941 |